United States Patent Office 2,869,966
Patented Jan. 20, 1959

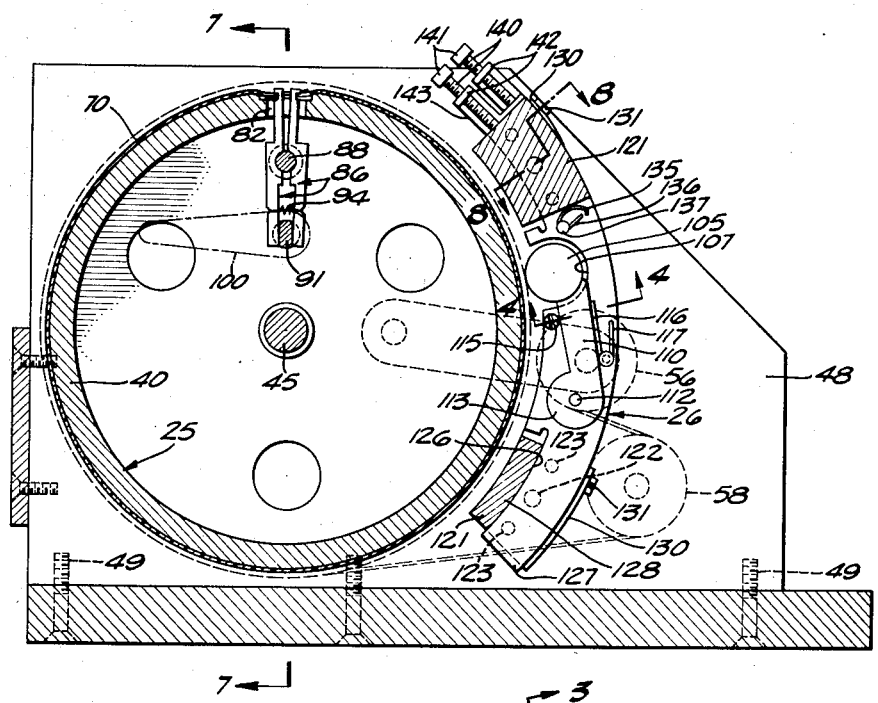
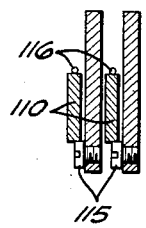
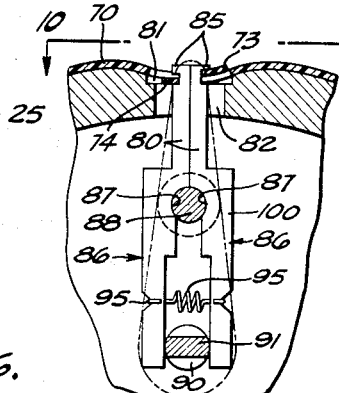
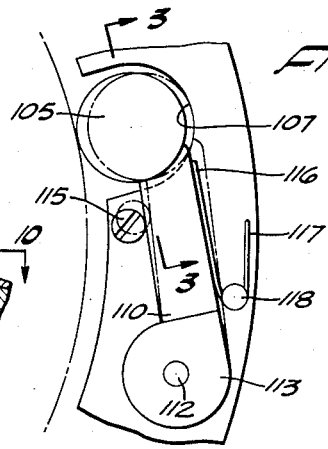
Jan. 20, 1959  J. M. CUNNINGHAM  2,869,966
RECORDING SHEET AND MEANS FOR MOUNTING SAME ON A ROTARY DRUM
Original Filed June 6, 1952  2 Sheets-Sheet 1
INVENTOR.
JAMES M. CUNNINGHAM
BY
ATTORNEY

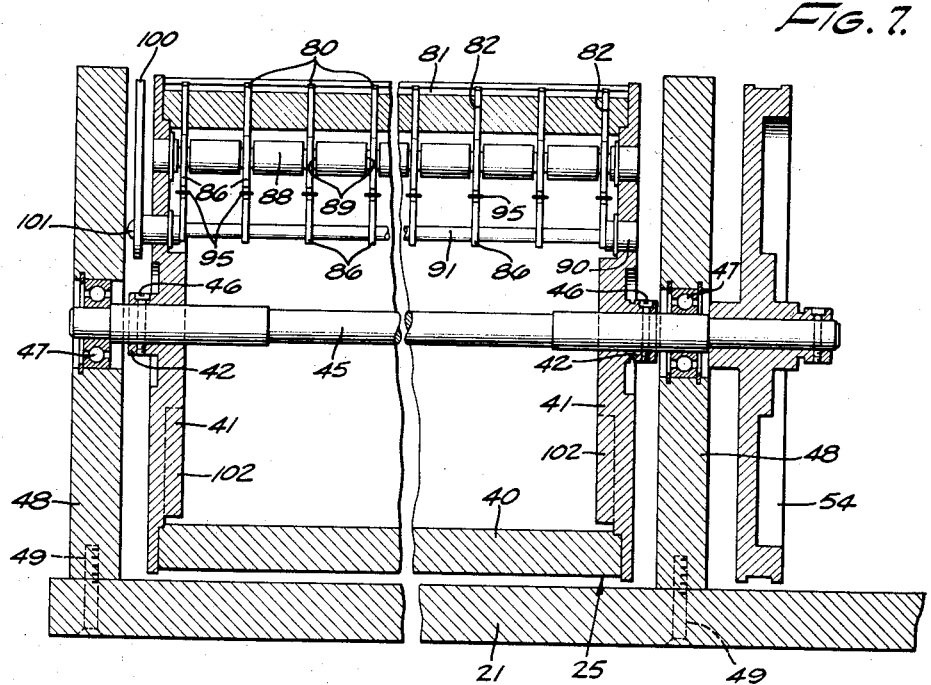

2,869,966

RECORDING SHEET AND MEANS FOR MOUNTING SAME ON A ROTARY DRUM

James M. Cunningham, Encino, Calif., asisgnor to E. R. Chilcott and Doris C. Chilcott, a co-partnership doing business as Techno Instrument Company, Los Angeles, Calif.

Original application June 6, 1952, Serial No. 292,104, now Patent No. 2,806,757, dated September 17, 1957. Divided and this application August 3, 1955, Serial No. 526,221

18 Claims. (Cl. 346—74)

This invention relates to recording devices of the type wherein a recording medium in the form of a sheet is releasably mounted on a drum or cylinder, the invention being directed both to the mounting means and to the sheet itself. While the invention is broadly applicable for its purpose, it has special utility as applied to a multiple-channel recorder for making a plurality of synchronous records from a plurality of signal sources on a single recording medium. Such a multiple-channel recorder may be employed, for example, in a geophysical exploration procedure wherein seismic waves created by a test explosion are detected at multiple terrain points for subsequent study and analysis.

This application is a division of my copending application entitled "Multiple-Channel Magnetic Recorder," Serial No. 292,104 filed June 6, 1952, now Patent No. 2,806,757, issued September 17, 1957.

The broad object of the invention is to provide a mode of cooperation between a rotary drum or cylinder and a recording sheet that will permit the recording sheet to be quickly and easily mounted in a positive manner at an accurately predetermined position on the cylinder and to be as quickly and easily removed.

One of the more specific objects of the invention is to assure that the mounted recording sheet overlies the peripheral surface of the drum in a smooth and snug manner under uniformly distributed tension. A special problem in this regard is to obtain the desired smoothness and distribution of tension regardless of minor variations in dimension among successively used recording sheets. Variations in dimension are unavoidable in practice.

The present invention meets this problem by applying yielding force at numerous points spaced across the width of the end of the recording sheet with each yielding force acting independently of all the others. In this regard a feature of the invention is the concept of overlapping the two ends of the sheet on the cylinder and of providing elongated apertures or slots in the two ends of the sheet with the slots positioned to overlap in a variable manner when the sheet is mounted on the cylinder. With this arrangement the application of yielding force to spread the various overlapping slots results in placing the sheet under the desired tension around the cylinder. The special advantage of the arrangement is that the slots may be so dimensioned and so positioned as to provide a range of adjustment sufficient to accommodate all minor variables encountered in practice including both variations in the dimensions of successive sheets and variations in different cylinders on which the sheets may be mounted.

A further problem is to provide means for mounting a sheet on the cylinder in the manner described that will not interfere with the travel of the sheet past the magnetic heads that are used both for recording signals on the sheet and for subsequently reproducing the signals. The invention meets this problem by providing a recess across the periphery of the cylinder in the region where the sheet ends overlap so that the overlapping ends of the sheet may be offset inwardly into the recess. This arrangement permits the use of sheet-engaging means in the cylinder recess inside the outer circumference of the cylinder, thus avoiding conflict with the magnetic heads that lie outside this circumference.

The various features, objects and advantages of the invention may be understood from the following description considered with the accompanying drawings.

In the drawings, which are to be regarded as merely illustrative:

Fig. 1 is a sectional view of a portion of the apparatus that includes the rotary drum and the associated magnetic heads;

Fig. 2 is an enlarged detail of Fig. 1 showing how a magnetic head is mounted on a holder;

Fig. 3 is a fragmentary section taken as indicated by the line 3—3 of Fig. 2;

Fig. 4 is a fragmentary section taken as indicated by the line 4—4 of Fig. 1;

Fig. 5 is a fragmentary sectional view showing one of the sheet engaging means in its release position;

Fig. 6 is an enlarged detail of Fig. 1 with the sheet engaging means shown in dotted lines;

Fig. 7 is a section taken along the axis of the drum as indicated by the line 7—7 of Fig. 1;

Fig. 8 is a fragmentary section taken as indicated by the broken line 8—8 of Fig. 1;

Fig. 9 is a fragmentary view taken as indicated by the arrow in Fig. 8, showing the index means for guidance in adjusting the magnetic heads; and Fig. 10 is a fragmentary view of the periphery of the drum showing the sheet engaging means extending through the wall of the drum.

*General arrangement*

The specific embodiment of the invention selected by way of illustration is a multiple channel, magnetic recorder-reproducer, designed primarily for field service in making seismic recordings for geographical exploration. This apparatus includes a rotary drum 25 on which is mounted a suitable recording medium in the form of a flexible sheet to be moved by the drum in a curved path of travel past a recording zone.

A bank or row of holders 26 for supporting magnetic heads in this zone is positioned relatively close to the periphery of the rotary drum, there being one holder 26 for each channel. In this preferred practice of the invention, the holders 26 are thin bars or blade-like members mounted edgewise with respect to the drum 25 and as many as forty-four such holders may be employed for simultaneously recording as many tracks on the magnetic sheet medium. Usually one of the tracks will be used for a timing record.

*Rotary drum and driving mechanism*

As best shown in Fig. 7 the rotary drum 25 comprises a cylindrical wall 40 supported by two circular end walls 41, each of the end walls having a hub portion 42. A suitable shaft 45 extending through the hub portions 42 and attached thereto by suitable screws 46 is journaled in suitable anti-friction bearings 47. The bearings 47 are mounted in a pair of vertical support plates 48 that are suitably attached to the base plate 21 by screws 49.

The rotary drum 25 may be actuated in any suitable manner, for example, by a synchronous motor in the motor housing. For this purpose the shaft 45 extends into the motor housing and carries a relatively large pulley 54 adapted to be actuated by an endless string belt 55. The string belt 55, which is maintained taut by an idler pulley 56 on a spring loaded arm 57, is actuated by a drive pulley 58. The drive pulley 58 is on a drive shaft 60, driven by suitable reducing gearing (not shown) in a gear case 61. The motor is connected with the gearing by a motor shaft 62 that carries a suitable flywheel 65.

Preferably suitable braking means is included to stop the rotary drum 25 immediately upon de-energization of the motor. This braking means may be of a well-known magnetic type which is normally spring actuated for braking effect and is electrically retracted to free the rotary drum from the motor. It is contemplated that the electrically retractable brake will be in the same circuit as the motor so that the brake will be automatically retracted whenever the motor is energized and will automatically stop the rotary drum immediately upon de-energization of the motor.

While any suitable recording medium in sheet form may be employed, the presently preferred medium is a powder-coated plastic sheet of the same construction as conventional magnetic tape. A recording sheet wrapped around the periphery of the rotary drum 25 suffices for the present purpose of geophysical exploration since the maximum recording period required for seismic wave recording in geophysical exploration is less than 6 seconds and a drum 7½ inches in diameter recording at a peripheral speed of 3½ inches per second will make less than one complete revolution in 6 seconds. In the present preferred practice of the invention, the recording medium is in the form of a powder-coated plastic sheet 11¾ inches wide by 24¼ inches long which is wrapped lengthwise around the drum and is releasably attached thereto.

Sheet-attachment means

While the recording sheet may be releasably mounted on the rotary drum 25 by various expedients, a feature of the presently described preferred embodiment of the invention is the concept of employing recording sheets having suitable apertures in their two end portions with suitable sheet-engaging means built into the construction of the rotary drum 25 for cooperation with the sheet apertures. It is contemplated that the apertures at each end of a sheet will overlap on the rotary drum 25 in such manner that the sheet-engaging means may extend through the overlapping apertures and expand against the edges of the apertures thereby to place the sheet under longitudinal tension at a plurality of points.

This method of releasably securing a flexible recording sheet around a drum may be understood in principle by referring to Figs. 5, 6 and 10. A flexible recording sheet generally designated 70 is wrapped on the periphery of the rotary drum 25 with one end portion 73 of the sheet overlapping the second end portion 74. These two end portions 73 and 74 of the sheet 70 have pluralities of slots which match so that major portions of the pairs of slots overlap. It is important to note that only the outer end portions of the two slots overlap in the final position of the sheet 70. Thus in Fig. 6 showing the overlapping ends 73 and 74 in their final positions, the outer end or edge 75 of a slot 76 in the end portion 73 overlies the corresponding slot 77 in the other end portion 74 and the outer end or edge of the lower slot 77 underlies the upper slot 76. The other ends of the two slots are not in overlapping relationships. Thus a suitable means extending into the two slots and expanded longitudinally of the slots will engage the end portions 73 and 74 of the two slots to place the sheet under tension without interference by the inner ends of the slots.

Any suitable sheet-engaging means may be employed for this purpose in each pair of slots but preferably such means comprises a pair of movable fingers 80 shown in dotted lines in Fig. 6. It will be noted in Fig. 6, where the two fingers 80 are spread apart to place the sheet 70 under tension, one finger abuts the outer end portion 75 of the upper slot 76 and the other finger abuts the outer end 78 of the lower slot 77.

A further feature of the preferred practice of the invention is the fact that the sheet-engaging fingers 80 lie wholly within the outer circumference of the sheet-wrapped drum so that the sheet-engaging fingers may be out of range of magnetic heads that are positioned adjacent the drum to contact the outer surface of the wrapped sheet. To provide this feature the cylindrical wall 40 of the rotary drum 25 has a suitable longitudinal groove or recess 81 to receive the overlapping sheet ends 73 and 74 and is further provided with a plurality of longitudinal slots 82 arranged in a row along the groove 81. The sheet-engaging fingers 80 extend out through the drum slots 82 but terminate short of the circumference defined by a sheet on the drum.

In the preferred construction of the invention the sheet-engaging fingers 80 are notched or otherwise formed to provide end flanges 85 to engage the outer surface of the sheet 70, the two end flanges being of different thicknesses as shown in Fig. 5 since one end flange engages the outer end portion of the sheet and the other end flange engages the inner underlying edge portion of the sheet. Preferably all of the pairs of sheet-engaging fingers 80 are manually controlled in unison to contract for the purpose of engaging a sheet and to expand for the purpose of placing the sheet under tension.

The pairs of sheet-engaging fingers 80 may comprise the outer ends of pairs of cooperating levers generally designated 86 and best shown in Fig. 5. Each lever 86 of a pair has a cylindrically curved surface 87 to slidingly engage a longitudinal pivot rod 88 for rotary movement about the axis of the rod. As best shown in Fig. 7, the rod 88 is mounted in the end walls 41 of the rotary drum and is formed with spaced circumferential grooves 89 to receive the pairs of levers 86. The inner ends of each pair of the levers 86 straddle a rocker shaft 90 which is cut away longitudinally to provide an extensive cam portion 91. As shown in Fig. 5 the cam portion 91 is relatively narrow along one cross-sectional dimension. A suitable spring 94 having hooked ends 95 interconnects the two levers 86 to draw the two levers together thereby holding the two levers in engagement with the pivot rod 88.

In the released position of the two levers 86 wherein the two fingers 80 are contracted together as shown in Fig. 5, the rocker shaft 90 is rotated to a position at which the cam portion 91 of the shaft spreads the lower portions of the two levers apart in opposition to the spring 94. When the rocker shaft 90 is rocked 90° as shown in Fig. 1 the cam portion 91 of the rocker shaft permits the spring 94 to draw the two levers 86 of each pair together at their lower ends thereby to spread the fingers 80 apart into yielding engagement with the two ends of the sheet 70 as heretofore described. The pivot rod 88 acts as a fulcrum for the two levers 86 and the tension of the spring 94 in urging the two sheet-engaging fingers 80 apart is transmitted to the sheet 70.

The rocker shaft 90 may be manually controlled in any suitable manner. In the construction shown, for example, the rocker shaft extends through one of the end walls 41 of the rotary drum 25 and is journaled in the two end walls for rocking action. A suitable actuating arm 100 is mounted on the outer end of the rocker shaft 90 by a suitable screw 101. The actuating arm 100 is relatively thin as shown in Fig. 7 for operation in the clearance space between the rotary drum 25 and the adjacent support plate 48 and serves as a convenient finger piece for moving the rocker shaft between its two positions.

Since the pairs of levers 86 together with the pivot rod 88 and the rocker shaft 90 tend to throw the rotary drum 25 off balance the end walls 41 of the rotary drum are preferably formed with thickened portions 102 (Fig. 7) to serve as counterweights to balance the drum.

Mounting means for the magnetic heads

The preferred practice of the invention contemplates the employment of ring-type magnetic heads 105 which are specially designed for compactness in axial dimension. The magnetic heads 105 are closely spaced in a row across the periphery of the rotary drum 25, the row being aligned transversely or perpendicularly of the direction of travel of the recording sheet 70. While any suitable means may be provided for supporting the magnetic heads 105 in such a recording zone, the preferred practice of the invention is characterized by the use of holders 26 in the form of blade members as heretofore stated. As best shown in Fig. 2 the row of spaced blade-like holders 26 lie relatively close to the recording sheet 70 on the rotary drum 25 and the individual holders are of curved configuration. To provide space for the magnetic heads 105 the holders 26 are cut away at their inner edges to provide ample recesses 107 thus providing ample space for the row of magnetic heads 105.

Preferably the magnetic heads 105 are supported from the corresponding holders 26 by suitable mounting means that permit individual adjustment of the heads with respect to the periphery of the recording sheet 70 on the rotary drum. As best shown in Figs. 2, 3 and 4, each magnetic head 105 is mounted for this purpose on a thin arm 110 that extends into a space 111 between two of the holders 26 and is pivotally mounted on one of the holders by a suitable pivot stud 112. In the region of the pivot stud 112 each of the mounting means or arms 110 is formed with an ample bearing portion 113 that is in intimate sliding contact with the face of the corresponding holder 26, the purpose of such construction being to hold the magnetic head 105 accurately to a predetermined arc of adjustment relative to the rotary drum. Between the bearing portion 113 and the corresponding magnetic head 105, the mounting arm 110 is preferably relatively thin.

Preferably adjustability of the magnetic head 105 with reference to the rotary drum is provided by an adjustment screw 115 in cooperation with a suitable wire spring 116. The wire spring 116 has one end 117 seated in a suitable small bore in the holder 26 for anchorage and is bent around a stud 118 on the holder to press against the mounting arm 110. The adjustment screw 115 has an eccentric head as may be seen in Fig. 4 so that rotation of the screw in abutment with the mounting arm 110 varies the pivotal position of the mounting arm. Preferably the adjustment screw 115 is rotated to a position to permit the magnetic head to contact the sheet 70 on the rotary drum 25 but not to permit the magnetic head to touch the peripheral surface of the drum in the absence of a sheet 70.

Preferably relative movement between each magnetic head 105 and the corresponding holder 26 is limited to the adjustment described and additional adjustment of each magnetic head with respect to the direction of travel of the recording sheet 70 is accomplished by bodily movement of the holder 26 that carries the head. For this purpose, each of the holders 26 is longitudinally movable in an arcuate path of adjustment concentric to the rotary drum 25. It is contemplated that each holder 26 will be slidably mounted in a suitable slot in a suitable support means with the slot serving as a guide channel for the longitudinal adjustment movement of the holder.

In the present embodiment of the invention the blade-like holders 26 are supported by two spaced transverse support members 121, each of which extends between the two vertical support plates 48 and is fixedly attached thereto by a suitable screw 122 and a pair of dowels 123 as shown in Figs. 8 and 9. Each of the support members 121 has a row of openings or slots 125 each of which has an arcuate bottom surface 126 concentric to the rotary drum 25. Each of the holders 26 has an end portion 127 at each of its ends to slidingly extend into the slots 125 of the two support members 121. The two end portions 127 have arcuate edge surfaces 128 that are also of concentric curvature for sliding contact with the arcuate bottom surfaces of the slots 125. By virtue of this arrangement the various holders 26 may be slidingly adjusted longitudinally in the slots 125 of the two support members 121 and will be guided by the slots concentrically with respect to the rotary drum 25.

Any suitable means may be provided to slidingly retain the holders 26 in the slots 125 and to hold the holders individually at adjusted longitudinal positions in the slots. Preferably, the holders 26 are yieldingly pressed into sliding contact with the arcuate bottom surfaces of the slots and are yieldingly urged longitudinally against adjustable stops to fix their longitudinal positions.

The yielding means to retain the holders 26 in the slots in pressure contact with the arcuate bottom surfaces 126 of the slots may comprise suitable leaf springs 130 best shown in Figs. 8 and 9. Each of the leaf springs 130 is secured to one of the support members 121 by a suitable screw 131 and is formed with a pair of arms 132 each of which presses inward on one of the holders 26. As may be seen in Fig. 1 both of the support members 121 are provided with leaf springs 130 so that each of the holders 26 is pressed inward by a leaf spring arm 32 at each end of the holder.

The yielding means to urge each holder 26 in one longitudinal direction may comprise a suitable wire spring 135 having one end 136 inserted in the holder for anchorage, the wire spring being wrapped around a stud 137 on the holder in such manner as to press against the adjacent support member 121 and thereby tend to urge the holder longitudinally downward as viewed in Fig. 1.

The upper end of each holder 26 is provided with a suitable stop screw 140 which is in adjustable abutment with the upper support member 121, as shown in Fig. 1, to hold the holder at any desired longitudinal position in opposition to the pressure of the wire spring 125. Each screw 140 has a knurled head 141 for convenient manual rotation and is mounted in a flange 142 on the end of the holder, which flange overhangs the support member 121. In the construction shown, each flange 142 is provided by mounting an angular clip 142 on the end of the holder 26. A feature of the invention is the concept of positioning the angular clips 143 and the corresponding adjustment screws 140 in two rows with the successive screws staggered.

A suitable index means may be provided for guidance in manipulating the screws 140 for longitudinal adjustment of the individual holders 26. Such index means may be provided in any suitable manner and may be suitably calibrated. Fig. 9 shows, by way of example, an index arrangement that may be used to advantage for adjusting the holders 26 longitudinally to compensate for various distances of wave travel through the earth from a wave propagating point to various detectors corresponding to the channels of the apparatus.

The index arrangement includes a zero reference line 145 scribed on the upper support member 121 to intersect the row of slots 125. Each of the holders 26 is scribed with a corresponding reference line 146. When all of the adjustment screws 140 are manipulated to make all of the reference lines 146 on the various holders register with the zero reference line 145, all of the magnetic heads 105 are accurately positioned for synchronous recording of wave signals arriving simultaneously at detectors corresponding to the magnetic heads. Since the signal waves must travel various distances through the earth to reach the various detectors the signals do not arrive at the detectors simultaneously and therefore synchronous recording in the sense of geometrical simultaneity of the recorded signal components on the sheet 70 will require compensating longitudinal adjustment of the holders 26.

For guidance in such adjustment the zero reference line 145 on the support member 21 is part of a scale that extends in both directions from the zero reference line as may be seen in Fig. 9. The scale is calibrated in terms of milliseconds of recording time at the selected peripheral speed of the drum of 3½ inches per second. The range of adjustment may extend, as shown, from minus 20 milliseconds to plus 20 milliseconds.

*Operation of the apparatus*

The operation of the described multiple-channel magnetic recorder may be readily understood from the foregoing description. It is a simple matter to swing the actuating arm 100 to the position shown in Fig. 5 thereby to contract the two sheet-engaging fingers 80 in each of the drum slots 82. A recording sheet 70 is then wrapped around the drum and the overlapping slots 73 and 74 at the ends of the sheet are slipped over the ends of the contracted fingers 80. Throwing the actuating arm 100 from the position shown in Fig. 5 to the position shown in Fig. 1 rotates the cam 91 to permit the springs 94 of the various pairs of levers 86 to move the fingers 80 apart and this expanding action on the part of each pair of fingers 80 results in placing the sheet 70 in longitudinal tension at a plurality of spaced points across the rotary drum. In this manner the sheet 70 is stretched smooth against the peripheral surface of the rotary drum.

The various screws 140 are manipulated for longitudinal adjustment of the individual holders 26 to provide the desired phase synchronization of the multiple tracks on the recording sheet 70.

When the apparatus is readied for operation, steps are taken to create the desired seismic waves by detonation and the motor is energized to rotate the drum 25. At the end of the short recording period as the rotary drum approaches completion of one rotation the motor is deenergized and the brake automatically stops the rotary drum.

It is usually desirable to switch the magnetic heads 105 immediately into reproducing circuits for reproduction of the recorded signals to make sure that proper recording has been accomplished. Once the recording has been checked in this manner the sheet 70 may be removed from the drum and filed for further study.

The complete record sheet may be filed in the convenient and compact manner of a sheet of paper and provides a permanent record not subject to deterioration nor vulnerable to damage in the course of ordinary handling. It is especially advantageous that the recording of the multiple signals is reproducible immediately at the end of the recording period. If desired, the recorded signals may be analyzed on the spot and to this end the signals may be fed to a suitable electronic analyzer and electronic filters may be employed for selective study of significant components of the signals.

My description in specific detail of a preferred practice of the invention will suggest to those skilled in the art various changes, substitutions and other departures from my illustrative disclosure that properly lie within the spirit and scope of the appended claims.

I claim:

1. In a device of the character described, the combination of: a rotary drum having a generally cylindrical external surface and a longitudinal peripheral recess; a magnetic recording medium in the form of a sheet wrapped around said drum with the ends of the sheet overlapping at said recess, said overlapping ends having a plurality of pairs of apertures positioned along the complete length of said overlapping ends, said pairs of apertures overlapping at their outer ends; a plurality of magnetic recording heads mounted in a position contiguous to the external surface of said drum and along its length; means to urge said magnetic recording heads against said recording medium; and a plurality of sheet-engaging means carried by said drum and extending outward at said recess into said pairs of apertures respectively, said sheet-engaging means being adapted to retractably expand in said pairs of overlapping apertures to place said sheet under tension, said sheet-engaging means being positioned generally within the cylindrical external surface of said drum and having circumferentially extending flanges to hold said sheet ends on said sheet-engaging member and within said recess.

2. A rotary drum as set forth in claim 1 which includes yielding means to expand said sheet-engaging means thereby to yieldingly tension said sheet.

3. A rotary drum as set forth in claim 2 which includes manually operable means to contract said sheet-engaging means in unison in opposition to said yielding means.

4. A rotary drum as set forth in claim 3 in which each of said sheet-engaging means comprises a pair of pivoted members and yielding means cooperative therewith to urge said pivoted members apart.

5. A combination as set forth in claim 4 in which said manually operable means is controlled by an operating member at one end of the drum.

6. In a device of the character described, a rotary drum to carry a recording medium in the form of a sheet wrapped around the drum with the ends of the sheet overlapping, said overlapping ends having pluralities of apertures positioned along the complete length of said overlapping ends, said apertures being positioned and dimensioned to overlap at their outer ends when the sheet is on the drum, said drum having a peripheral recess to permit the overlapping ends of the sheet to be flexed inside the outer circumference of the drum; a plurality of magnetic recording heads mounted in a position contiguous to the cylindrical external surface of said drum and along its length; means to urge said magnetic recording heads against said recording medium; pairs of pivoted fingers extending outward from the interior of the drum into said recess but not beyond the outer circumference of the drum to engage respectively the pairs of overlapping apertures of the sheet, said fingers also having circumferentially extending flanges to hold said sheet ends on the ends of said fingers and within said recess; yielding means to urge the fingers of each of said pairs apart thereby to place said sheet under tension; and manually operable means to contract said pairs of fingers to sheet-releasing positions.

7. In a device of the character described, the combination of: a rotary drum having a generally cylindrical surface and a longitudinal peripheral recess; a magnetic recording medium in the form of a sheet wrapped around said drum with the ends of the sheet overlapping at said recess, said overlapping ends having a plurality of pairs of apertures overlapping at their outer ends; a plurality of magnetic recording heads mounted in a position contiguous to the external surface of said drum and along its length; means to urge said magnetic recording heads against said recording medium, said heads being movable back and forth to accommodate any unevenness in said record or eccentricity in said drum; a plurality of sheet-engaging means carried by said drum and extending outwardly at said recess into said pairs of apertures respectively, said sheet-engaging means being adapted to retractably expand in said pairs of overlapping apertures to place said sheet under tension; and stop means to prevent said magnetic recording heads from touching said sheet-engaging means.

8. The invention as defined in claim 7, wherein said sheet-engaging means is positioned generally within the external surface of said drum having circumferentially extending flanges to hold said sheet ends on said drum within said recess.

9. In a device of the character described, a rotary drum to carry a recording medium in the form of a sheet wrapped around the drum with the ends of the sheet overlapping, said overlapping ends having pluralities of apertures positioned and dimensioned to overlap at their outer ends when the sheet is on the drum; pairs of fingers pivoted from about an axis longitudinally through said drum, said fingers extending outwardly from the interior of the drum to project through respective pairs of overlapping apertures of the sheet; yielding means to urge the fingers of each of said pairs apart thereby to place said sheet under tension, each corresponding pair of fingers being free to rotate about said axis independently of any other corresponding pair when said yielding means is operative; and manually operable means to contract said pairs of fingers to render said yielding means inoperative and thereby to place the sheet-engaging ends of said fingers together.

10. The invention as defined in claim 9, wherein said sheet-engaging means is positioned generally within the external surface of said drum having circumferentially extending flanges to hold said sheet ends on said drum within said recess.

11. The invention as defined in claim 10, wherein said manually operable means is a shaft having a cam for each of said fingers, said cam having a small and large diameter to fit between ends of said fingers opposite their sheet-engaging ends and on the opposite side of said axis.

12. The invention as defined in claim 11, wherein said drum and the sheet-engaging ends of said fingers are both recessed longitudinally along the length of the drum, wherein a plurality of magnetic recording heads are mounted in a position contiguous to the external surface of said drum and along its length; wherein resilient means are provided to urge said magnetic recording heads against said recording medium, said recording heads having freedom of movement toward and away from said drum; and wherein stop means are additionally provided to prevent said recording heads from touching said fingers.

13. In recording and reproducing apparatus, the combination comprising: a generally cylindrical drum; a record sheet wrapped around said drum with its ends overlapping, said overlapping ends having at least a pair of apertures overlapping only at their outer ends; a pair of fingers pivoted from about an axis extending generally longitudinally through said drum, said fingers extending outwardly from the interior of said drum to project through said overlapping apertures; yielding means to urge the outer ends of said fingers apart to place said record sheet in tension, both of said fingers being free to rotate about said axis to hold said record sheet in the position it was originally wrapped around said drum; and means for contracting the outer ends of said fingers to render said yielding means inoperative.

14. In recording and reproducing apparatus, the combination comprising: a generally cylindrical drum; a record sheet wrapped around said drum with its ends overlapping, said overlapping ends having at least a pair of apertures overlapping only at their outer ends; a pair of fingers pivoted from about the same axis, extending generally longitudinally through said drum, said fingers extending outwardly from said axis in the interior of said drum to project through said overlapping apertures, said fingers also extending inwardly in the drum beyond said axis; resilient means connected to the inner ends of said fingers to urge the outer ends of said fingers apart to place said record sheet in tension; and means to contract the outer ends of said fingers to render said yielding means inoperative.

15. The invention as defined in claim 14, wherein said means to contract said fingers includes a shaft and a cam on said shaft having a small and large diameter to fit between the inner ends of said fingers.

16. In recording and reproducing apparatus, the combination comprising: a generally cylindrical drum; a record sheet wrapped around said drum with its ends overlapping, said overlapping ends having a plurality of more than two pairs of apertures overlapping only at their outer ends; a pair of fingers for each of said pair of overlapping apertures pivoted from about an axis extending generally longitudinally through said drum, each of said pair of fingers extending outwardly from the interior of said drum to project through a corresponding pair of overlapping apertures; yielding means to urge the outer ends of said fingers apart to place said record sheet in tension; and means for contracting the outer ends of said fingers to render said yielding means inoperative.

17. In recording and reproducing apparatus, the combination comprising: a generally cylindrical drum; a record sheet wrapped around said drum with its ends overlapping, said overlapping ends having a plurality of pairs of apertures overlapping only at their outer ends; a pair of fingers for each of said pair of overlapping apertures pivoted from about an axis extending generally longitudinally through said drum, each of said pair of fingers extending outwardly from the interior of said drum to project through a corresponding pair of overlapping apertures; yielding means to urge the outer ends of said fingers apart to place said record sheet in tension; and means for contracting the outer ends of each of said pairs of fingers simultaneously to render said yielding means inoperative.

18. The invention as defined in claim 17, wherein said means to contract said fingers includes a shaft and a cam on said shaft for each of said pairs of fingers, each cam being disposed in the same angular position on said shaft and having small and large diameters to fit between inner ends of said fingers.

References Cited in the file of this patent

UNITED STATES PATENTS

| | | |
|---|---|---|
| 1,531,124 | Murray | Mar. 24, 1925 |
| 2,109,152 | Meisel | Feb. 22, 1938 |
| 2,729,453 | Camras | Jan. 3, 1956 |